(12) United States Patent
Sakaguchi

(10) Patent No.: US 10,953,883 B2
(45) Date of Patent: Mar. 23, 2021

(54) VEHICLE CONTROL DEVICE

(71) Applicant: TOYOTA JIDOSHA KABUSHIKI KAISHA, Toyota (JP)

(72) Inventor: Eiji Sakaguchi, Sunto-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 16/173,089

(22) Filed: Oct. 29, 2018

(65) Prior Publication Data
US 2019/0126928 A1 May 2, 2019

(30) Foreign Application Priority Data

Nov. 1, 2017 (JP) .............................. JP2017-211839

(51) Int. Cl.
*B60W 30/18* (2012.01)
*B62D 15/02* (2006.01)
*B60W 10/20* (2006.01)
*B60W 10/18* (2012.01)

(52) U.S. Cl.
CPC ... *B60W 30/18163* (2013.01); *B62D 15/0255* (2013.01); *B60W 10/18* (2013.01); *B60W 10/20* (2013.01); *B60W 2420/42* (2013.01); *B60W 2420/52* (2013.01)

(58) Field of Classification Search
CPC .......... B60W 30/18163; B60W 10/20; B60W 2420/42; B60W 10/18; B60W 2420/52; B60W 2050/143; B60W 2554/00; B60W 2556/50; B60W 10/06; B60W 50/14; B60W 2720/103; B60W 2720/106; B60W 2050/146; B62D 15/0255
See application file for complete search history.

(56) References Cited

U.S. PATENT DOCUMENTS 9,229,453 B1 * 1/2016 Lee ...................... B60W 30/12
2019/0291727 A1 * 9/2019 Shalev-Shwartz .......................... G01C 21/3602

FOREIGN PATENT DOCUMENTS

JP 2003-025868 A 1/2003

* cited by examiner

*Primary Examiner* — Nga X Nguyen
(74) *Attorney, Agent, or Firm* — Sughrue Mion, PLLC

(57) ABSTRACT

The vehicle control device includes a speed profile generation unit configured to generate a speed profile of the vehicle in the lane change control, a vehicle control unit configured to control a vehicle speed of the vehicle along the speed profile when the lane change control is executed, and a deceleration condition determination unit configured to determine whether or not a deceleration condition in the lane change control is satisfied. The speed profile generation unit is configured to generate the speed profile such that a deceleration upper limit of the vehicle in the lane change control is lower in value when the deceleration condition determination unit determines that the deceleration condition is satisfied than when the deceleration condition determination unit determines that the deceleration condition is not satisfied.

11 Claims, 4 Drawing Sheets

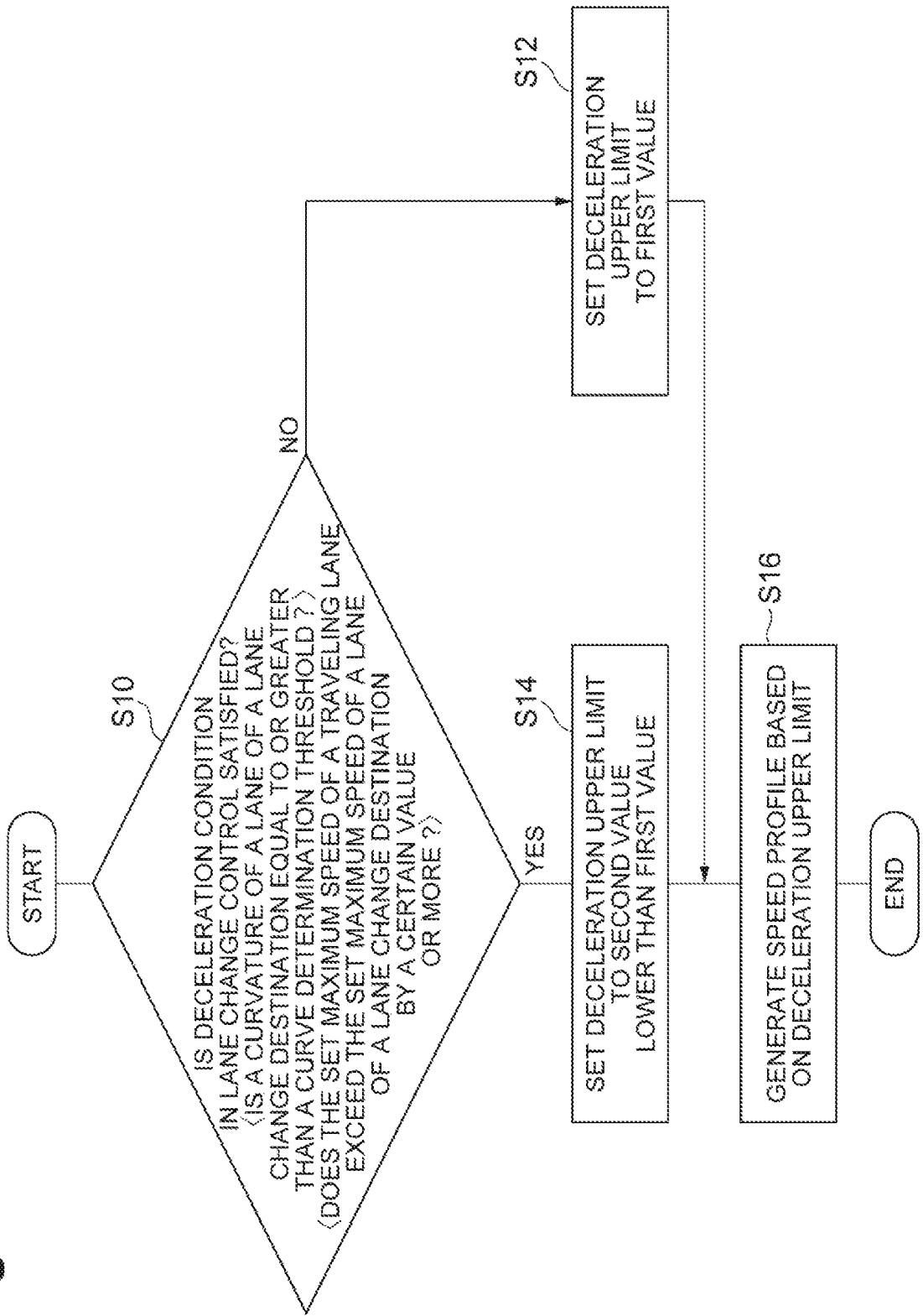

ing condition is satisfied than when the deceleration condition determination unit determines that the deceleration condition is not satisfied.

VEHICLE CONTROL DEVICE

TECHNICAL FIELD

The present disclosure relates to a vehicle control device performing lane change control.

BACKGROUND

In the related art, Japanese Unexamined Patent Publication No. 2003-25868 is known as technical literature relating to a device performing lane change control. The lane change support device that is described in Japanese Unexamined Patent Publication No. 2003-25868 adjusts a speed of a host vehicle to the speed of an adjacent vehicle at a lane change destination once a driver operates a lane change switch. Subsequently, the lane change support device selects the adjacent vehicle that is closest to a target inter-vehicle distance set shorter than the inter-vehicle distance at the lane change destination as a preceding vehicle and outputs a target vehicle speed for controlling the distance between the vehicle and the selected preceding vehicle at the lane change destination to the target inter-vehicle distance.

CROSS-REFERENCE TO RELATED APPLICATION

This application claims the benefit of priority from Japanese Patent Application No. 2017-211839, filed Nov. 1, 2017, the entire contents of which are incorporated herein by reference.

SUMMARY

Appropriate deceleration needs to be performed before curve entry when lane change is performed toward a curved exit road leading from a limited-access road to a general road. When a lane that is a lane change destination is curved as described above, an occupant may feel discomfort once significant deceleration attributable to the curve at the lane change destination that the occupant is unlikely to be conscious of is performed during the lane change. In addition, a following vehicle performing the lane change behind the vehicle may fail to predict the significant deceleration during the lane change and the vehicle and the following vehicle may become too close to each other.

Desired in this technical field in this regard is a vehicle control device capable of suppressing significant deceleration during lane change control.

An aspect of the present disclosure for solving the above problem relates to a vehicle control device configured to perform lane change control for a vehicle along a preset lane change path. The vehicle control device includes a map database configured to store map information, a speed profile generation unit configured to generate a speed profile of the vehicle in the lane change control, a vehicle control unit configured to control a vehicle speed of the vehicle along the speed profile when the lane change control is executed, and a deceleration condition determination unit configured to determine whether or not a deceleration condition in the lane change control is satisfied based on the lane change path and the map information. The speed profile generation unit is configured to generate the speed profile such that a deceleration upper limit of the vehicle in the lane change control is lower in value when the deceleration condition determination unit determines that the decelera- In the vehicle control device according to the aspect of the present disclosure, the speed profile is generated such that the deceleration upper limit of the vehicle in the lane change control is lower in value when the deceleration condition in the lane change control is satisfied because of the presence of a steep curve in the lane change destination lane or the like than when the deceleration condition determination unit determines that the deceleration condition is not satisfied, and thus significant deceleration during the lane change control can be suppressed.

In the vehicle control device according to the aspect of the present disclosure, the deceleration condition determination unit may be configured to determine that the deceleration condition is satisfied when a curvature of a lane that is a lane change destination according to the lane change control is equal to or greater than a curve determination threshold.

In the vehicle control device according to the aspect of the present disclosure, the map information may include information on set maximum speeds associated with lanes on a map and the deceleration condition determination unit may be configured to determine that the deceleration condition is satisfied when the set maximum speed of a traveling lane of the vehicle exceeds the set maximum speed of a lane that is a lane change destination by a certain value or more.

In the vehicle control device according to the aspect of the present disclosure, the speed profile generation unit may be configured to generate the speed profile by calculating each of a preset upper limit speed, a speed limit at a speed limit point included in the map information, a curvature corresponding speed that depends on a curvature of the traveling lane of the vehicle, and an obstacle situation speed that depends on a situation of a moving obstacle around the vehicle, setting a target vehicle speed equal to or less than a lowest one of the upper limit speed, the speed limit, the curvature corresponding speed, and the obstacle situation speed for each of set positions preset along the lane change path, and interpolating the target vehicle speed for each of the set positions so that the deceleration is equal to or less than the deceleration upper limit by preset smooth interpolation processing.

As described above, significant deceleration during the lane change control can be suppressed with the vehicle control device according to the aspect of the present disclosure.

BRIEF DESCRIPTION OF THE DRAWINGS

FIG. 4 is a flowchart illustrating speed profile generation processing of the lane change control.

DETAILED DESCRIPTION

Hereinafter, an example of the present disclosure will be described with reference to accompanying drawings.

Figure 1:
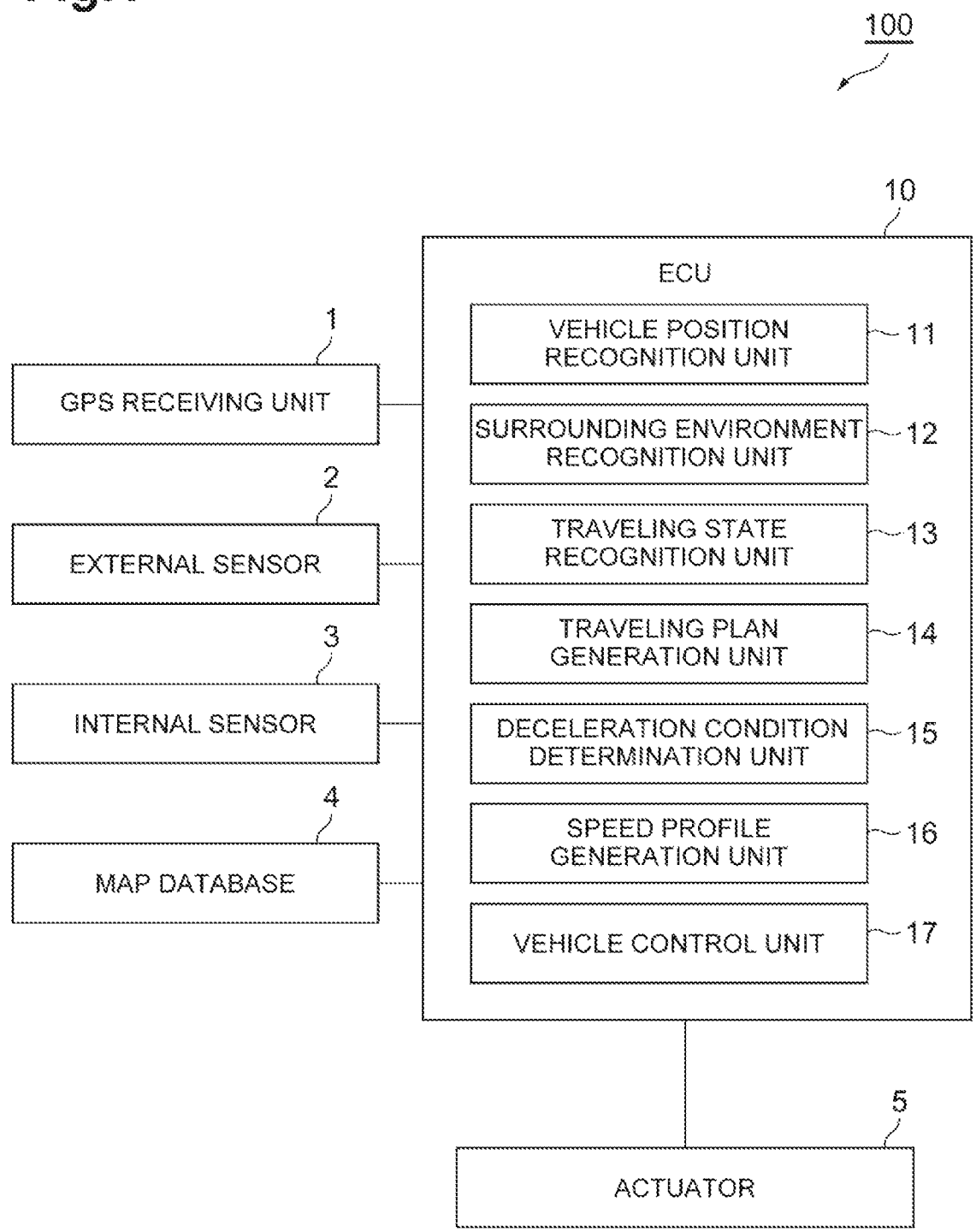
FIG. 1 is a block diagram illustrating a vehicle control device according to an example.

A vehicle control device 100 according to the example illustrated in FIG. 1 is mounted in a vehicle such as a passenger car and controls traveling of the vehicle. The vehicle control device 100 has a function to execute autonomous driving by which the vehicle autonomously travels along a road on which the vehicle travels. The vehicle control device 100 executes lane change control as the autonomous driving. The lane change control is traveling control by which the vehicle performs lane change from a traveling lane of the vehicle to an adjacent lane adjacent to the traveling lane.

Configuration of Vehicle Control Device

The configuration of the vehicle control device 100 will be described below with reference to accompanying drawings. As illustrated in FIG. 1, the vehicle control device 100 is provided with an electronic control unit [ECU] 10 controlling traveling of the vehicle. The ECU 10 is an electronic control unit that has a central processing unit [CPU], a read only memory [ROM], a random access memory [RAM], and the like. The ECU 10 executes various types of vehicle control by loading a program stored in the ROM into the RAM and executing the program with the CPU. A plurality of electronic control units may constitute the ECU 10 as well.

A GPS receiving unit 1, an external sensor 2, an internal sensor 3, a map database 4, and an actuator 5 are connected to the ECU 10.

The GPS receiving unit 1 measures a position of the vehicle (such as a latitude and a longitude of the vehicle) by receiving signals from three GPS satellites or more. The GPS receiving unit 1 transmits measured positional information regarding the vehicle to the ECU 10.

The external sensor 2 is detection equipment detecting a situation around the vehicle. The external sensor 2 includes at least one of a camera and a radar sensor.

The camera is imaging equipment imaging an external situation around the vehicle. The camera is disposed on the back side of the windshield of the vehicle. The camera transmits imaging information related to the external situation regarding the vehicle to the ECU 10. The camera may be a monocular camera or may be a stereo camera. The stereo camera has two imaging units that are placed to reproduce a binocular disparity. Depth direction information is also included in the imaging information of the stereo camera.

The radar sensor is detection equipment detecting obstacles around the vehicle by using radio waves (such as millimeter waves) or light. The radar sensor includes, for instance, a millimeter wave radar device or a light detection and ranging [LIDAR] device. The radar sensor detects the obstacles by transmitting the radio waves or the light to the surroundings of the vehicle and receiving the radio waves or the light reflected by the obstacles. The radar sensor transmits detected obstacle information to the ECU 10. The obstacles include moving obstacles such as pedestrians, bicycles, and other vehicles as well as fixed obstacles such as guardrails and buildings.

The internal sensor 3 is detection equipment detecting a traveling state of the vehicle. The internal sensor 3 includes a vehicle speed sensor, an acceleration sensor, and a yaw rate sensor. The vehicle speed sensor is a measurer that measures the speed of the vehicle. A vehicle wheel speed sensor that is disposed with respect to a vehicle wheel of the vehicle, a drive shaft rotating integrally with the vehicle wheel, or the like and measures a rotation speed of the vehicle wheel is used as the vehicle speed sensor. The vehicle speed sensor transmits measured vehicle speed information (vehicle wheel speed information) to the ECU 10.

The acceleration sensor is a measurer that measures the acceleration of the vehicle. The acceleration sensor includes, for instance, a longitudinal acceleration sensor measuring the acceleration of the vehicle in a longitudinal direction and a lateral acceleration sensor measuring the lateral acceleration of the vehicle. The acceleration sensor transmits, for instance, acceleration information regarding the vehicle to the ECU 10. The yaw rate sensor is a measurer that measures the yaw rate (rotation angular velocity) around a vertical axis of a center of gravity of the vehicle. A gyro sensor or the like can be used as the yaw rate sensor. The yaw rate sensor transmits measured yaw rate information regarding the vehicle to the ECU 10.

The map database 4 is a database in which map information is stored. The map database 4 is formed within, for instance, a hard disk drive [HDD] that is mounted in the vehicle. The map information includes, for instance, positional information regarding roads, road shape information (such as the types and curvatures of curves and linear sections), positional information regarding junctions and intersection points, and positional information regarding structures. The map information may also include traffic rule information such as set maximum speeds associated with lanes (such as legal maximum speeds).

The map database 4 may be stored in a computer in a facility such as a management center capable of communicating with the vehicle. In addition, the traffic rule information may be stored in a database other than the map database as a traffic rule map associated with the map information.

The actuator 5 is a device that is used for the vehicle control. The actuator 5 includes at least a drive actuator, a brake actuator, and a steering actuator. The drive actuator controls a drive force of the vehicle by controlling the amount of air supply to an engine (throttle opening degree) in accordance with a control signal from the ECU 10. When the vehicle is a hybrid vehicle, the drive force is controlled by the control signal from the ECU 10 being input to a motor as a power source as well as by means of the amount of air supply to the engine. When the vehicle is an electric vehicle, the drive force is controlled by the control signal from the ECU 10 being input to the motor as the power source. The motors as the power source in these cases constitute the actuator 5.

The brake actuator controls a brake system in accordance with the control signal from the ECU 10 and controls a braking force given to the vehicle wheel of the vehicle. A hydraulic brake system or the like can be used as the brake system. The steering actuator controls, in accordance with the control signal from the ECU 10, driving of an assist motor that controls a steering torque in an electric power steering system. In this manner, the steering actuator controls the steering torque of the vehicle.

The functional configuration of the ECU 10 will be described below. The ECU 10 has a vehicle position recognition unit 11, a surrounding environment recognition unit 12, a traveling state recognition unit 13, a traveling plan generation unit 14, a deceleration condition determination unit 15, a speed profile generation unit 16, and a vehicle control unit 17.

The vehicle position recognition unit 11 recognizes the position of the vehicle on a map based on the positional information of the GPS receiving unit 1 and the map information of the map database 4. In addition, the vehicle position recognition unit 11 recognizes the position of the vehicle with simultaneous localization and mapping [SLAM] technology by using the detection result of the external sensor 2 and the positional information included in the map information of the map database 4 and related to the fixed obstacles such as an electric pole. Alternatively, the vehicle position recognition unit 11 may recognize the position of the vehicle on the map by a known method.

The surrounding environment recognition unit 12 recognizes surrounding environment of the vehicle based on the detection result of the external sensor 2. The surrounding environment includes situations regarding the obstacles (moving obstacles and fixed obstacles) around the vehicle. In other words, the surrounding environment includes, for instance, the positions of the obstacles with respect to the vehicle, relative speeds of the obstacles with respect to the vehicle, and movement directions of the obstacles with respect to the vehicle. The surrounding environment recognition unit 12 recognizes the surrounding environment of the vehicle by a known method and based on an image captured by the camera and the obstacle information of the radar sensor.

The traveling state recognition unit 13 recognizes the traveling state of the vehicle based on the detection result of the internal sensor 3. The traveling state includes the vehicle speed of the vehicle, the acceleration of the vehicle, and the yaw rate of the vehicle. Specifically, the traveling state recognition unit 13 recognizes the vehicle speed of the vehicle based on the vehicle speed information of the vehicle speed sensor. The traveling state recognition unit 13 recognizes the acceleration of the vehicle based on the vehicle speed information of the acceleration sensor. The traveling state recognition unit 13 recognizes a direction of the vehicle based on the yaw rate information of the yaw rate sensor.

The traveling plan generation unit 14 generates a traveling plan of the vehicle relating to the autonomous driving based on a preset target route, the map information of the map database 4, the surrounding environment regarding the vehicle recognized by the surrounding environment recognition unit 12, and the traveling state of the vehicle recognized by the traveling state recognition unit 13. The target route is set based on, for instance, the current vehicle position on the map and a destination set by a driver. Alternatively, the destination may be automatically set from a past traveling history or the like by a known navigation system.

The traveling plan generation unit 14 generates the traveling plan including the lane change control that is needed for reaching the destination based on the preset target route and the map information of the map database 4. The traveling plan generation unit 14 generates a lane change path for vehicle traveling during the lane change control for the vehicle. The lane change path is a path for the vehicle traveling from the traveling lane of the vehicle toward an adjacent lane that is a lane change destination. The lane change path is generated as, for instance, a smooth path for smoothly reaching the middle position of the adjacent lane in the lane width direction from the middle position of the traveling lane of the vehicle in the lane width direction. Lane change path generation methods are not particularly limited and various known methods can be adopted.

The deceleration condition determination unit 15 determines whether or not a deceleration condition in the lane change control is satisfied based on the lane change path and the map information. The deceleration condition in the lane change control is a condition for determining whether or not a significant deceleration of the vehicle is needed during the lane change control. Here, the determination is made with regard to a case where a static factor causes the significant deceleration. The static factor includes a geographical factor such as the curvature of a lane. The static factor can also include factors relating to traffic rules such as the legal maximum speed of a lane.

Specifically, the deceleration condition determination unit 15 determines that the deceleration condition is satisfied when the curvature of the lane that is a lane change destination is equal to or greater than a curve determination threshold. The curvature of the lane that is a lane change destination means the curvature of a section including the lane change path and a section within a certain distance from the end point of the lane change path (lane change control termination position) in the lane change destination lane.

The curve determination threshold is a preset threshold. The value of the curve determination threshold may also vary with the vehicle speed at the initiation of the lane change control for the vehicle. The curve determination threshold may also change such that the value decreases as the vehicle speed at the initiation of the lane change control for the vehicle increases. The curve determination threshold may also be set such that the value is smaller when the vehicle speed at the initiation of the lane change control for the vehicle is equal to or greater than a vehicle speed threshold than when the vehicle speed is less than the vehicle speed threshold.

The deceleration condition determination unit 15 may also determine that the deceleration condition is satisfied when a width of the lane change destination lane is less than a narrow width threshold. The narrow width threshold is a preset value. The value of the narrow width threshold also may vary with the vehicle speed at the initiation of the lane change control for the vehicle. The narrow width threshold may also change such that the value decreases as the vehicle speed at the initiation of the lane change control for the vehicle increases. The narrow width threshold may also be set such that the value is smaller when the vehicle speed at the initiation of the lane change control for the vehicle is equal to or greater than the vehicle speed threshold than when the vehicle speed is less than the vehicle speed threshold.

The deceleration condition determination unit 15 may also determine that the deceleration condition is satisfied when a falling gradient of the lane change destination lane is equal to or greater than a gradient threshold. The gradient threshold is a preset value. The value of the gradient threshold also may vary with the vehicle speed at the initiation of the lane change control for the vehicle. The gradient threshold may also change such that the value decreases as the vehicle speed at the initiation of the lane change control for the vehicle increases. The gradient threshold may also be set such that the value is smaller when the vehicle speed at the initiation of the lane change control for the vehicle is equal to or greater than the vehicle speed threshold than when the vehicle speed is less than the vehicle speed threshold.

The deceleration condition determination unit 15 may also determine that the deceleration condition is satisfied when the set maximum speed of the traveling lane of the vehicle exceeds the set maximum speed of the lane change destination lane by a certain value or more. The set maximum speeds are the maximum speeds preset with respect to the lanes. The set maximum speeds can be, for instance, the legal maximum speeds set with respect to the lanes. The set maximum speeds are not limited to the legal maximum speeds and may also be maximum speeds set from the viewpoint of traffic flow facilitation or the like. The certain value is a preset value.

When the sections in the lane change destination lane have different set maximum speeds, the lowest one of the set maximum speeds of the section including the lane change path and the section within a certain distance from the end point of the lane change path (lane change control termination position) can be the set maximum speed of the lane change destination lane.

The deceleration condition determination unit 15 may also determine that the deceleration condition is satisfied when the vehicle speed of the vehicle at the initiation of the lane change control exceeds the set maximum speed of the lane change destination lane by a certain value or more based on the map information, the lane change path, and the vehicle speed of the vehicle recognized by the traveling state recognition unit 13. In this case, the deceleration condition determination unit 15 is capable of determining the necessity of deceleration entailed by lane change based on the actual vehicle speed of the vehicle.

Figure 2:
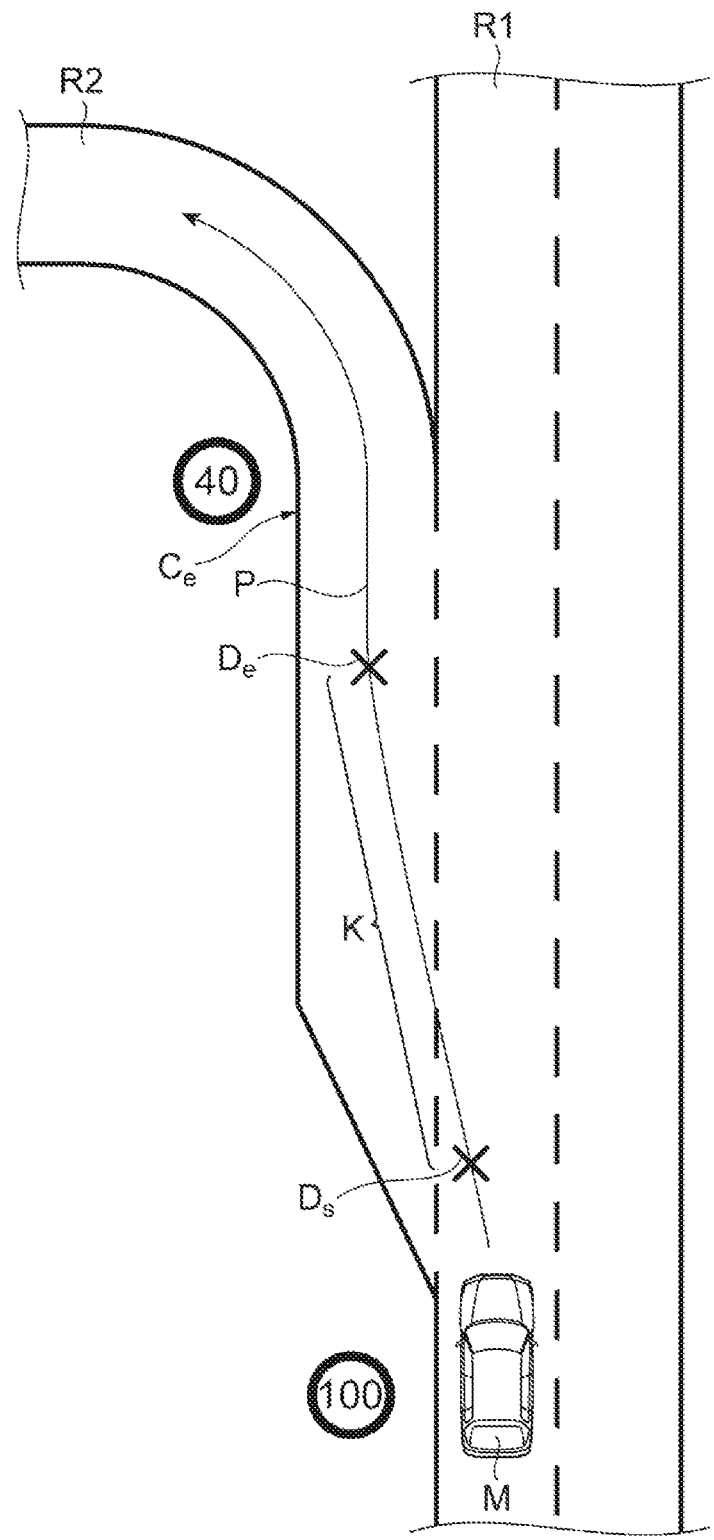
FIG. 2 is a plan view for showing a case where a deceleration condition in lane change control is satisfied.

FIG. 2 is a plan view for showing a case where the deceleration condition in the lane change control is satisfied. Illustrated in FIG. 2 are a vehicle M, a lane (traveling lane) R1 in which the vehicle M travels, a lane change destination lane R2, a traveling path P of the vehicle M, a lane change path K included in the traveling path P, a lane change control initiation position Ds, a lane change control termination position De, and a termination position Ce of the common part of the lane R1 of a limited-access road and the lane R2 of an exit road.

In FIG. 2, the vehicle M traveling on the limited-access road is about to perform lane change to the lane R2, which is the exit road leading from the limited-access road to a general road. The lane R2 as the exit road forms a significant curve ahead of the part where the lane R2 branches from the lane R1 of the limited-access road. The curve of the lane R2 is within a certain distance from the lane change control termination position De and the curvature of the curve is equal to or greater than the curve determination threshold described above. In addition, in FIG. 2, the legal maximum speed of the lane R1 as the limited-access road is 100 km/h and the same legal maximum speed is applied up to the termination position Ce of the common part in the exit road lane R2. In the lane R2, the legal maximum speed is 40 km/h beyond the termination position Ce of the common part.

In the situation that is illustrated in FIG. 2, the deceleration condition determination unit 15 determines that the deceleration condition is satisfied because the curvature of the lane change destination lane R2 is equal to or greater than the curve determination threshold. Alternatively, in the situation that is illustrated in FIG. 2, the deceleration condition determination unit 15 may determine that the deceleration condition is satisfied from the fact that the legal maximum speed of the limited-access road lane R1 (100 km/h) exceeds the legal maximum speed of the exit road lane R2 (40 km/h) by a certain value (such as 30 km/h). The deceleration condition determination unit 15 sets a deceleration upper limit in accordance with the result of the deceleration condition determination.

The speed profile generation unit 16 generates a vehicle speed profile in the lane change control. The speed profile is a vehicle speed plan used for vehicle speed control. The speed profile includes a target vehicle speed that depends on the position of the vehicle.

The speed profile generation unit 16 generates the speed profile such that the deceleration upper limit of the vehicle in the lane change control is lower in value when the deceleration condition determination unit 15 determines that the deceleration condition in the lane change control is satisfied than when the deceleration condition determination unit 15 determines that the deceleration condition in the lane change control is not satisfied. The deceleration upper limit is the upper limit of vehicle deceleration during the lane change control.

The generation of the speed profile will be described in detail below. The speed profile generation unit 16 generates the speed profile based on the map information of the map database 4, the surrounding environment regarding the vehicle recognized by the surrounding environment recognition unit 12, the traveling state of the vehicle recognized by the traveling state recognition unit 13, the lane change path generated by the traveling plan generation unit 14, and the deceleration upper limit set by the deceleration condition determination unit 15.

The speed profile generation unit 16 calculates each of a preset upper limit speed, the speed limit at a speed limit point included in the map information, a curvature corresponding speed that depends on the curvature of the lane that is lane change destination of the vehicle, and an obstacle situation speed that depends on the situation of a moving obstacle around the vehicle.

Specifically, the speed profile generation unit 16 sets the set maximum speed of the traveling lane of the vehicle and the set maximum speed of the lane change destination lane as the upper limit speeds. Alternatively, the speed profile generation unit 16 may set the vehicle speed at the initiation of the lane change control for the vehicle as the upper limit speed.

The speed profile generation unit 16 recognizes the speed limit at the speed limit point included in the map information based on the lane change path and the map information. The speed limit point is a speed-limited point such as a temporary stop line and a crosswalk sign. For instance, the speed limit at the temporary stop line can be 0 km/h and the speed limit at the crosswalk sign can be 20 km/h. The speed limit may be included in the map information or may be stored in a database other than the map database 4. The speed profile generation unit 16 recognizes the speed limit at a speed limit point within a certain distance from the lane change path termination position as well as the speed limit at the speed limit point included in the lane change path.

The speed profile generation unit 16 calculates the curvature corresponding speed that depends on the curvature of the traveling lane of the vehicle based on the lane change path and the map information. The curvature of the traveling lane of the vehicle also includes the curvature of a section within a certain distance from the lane change control termination position. For instance, the speed profile generation unit 16 calculates the curvature corresponding speed from the curvature by using a curvature-vehicle speed map in which the curvature and the vehicle speed are associated with each other in advance.

The speed profile generation unit 16 calculates the obstacle situation speed that depends on the situation of the moving obstacle around the vehicle based on the surrounding environment of the surrounding environment recognition unit 12. For instance, the speed profile generation unit 16 adopts the vehicle speed of a preceding vehicle for the upper limit speed as the obstacle situation speed when the preceding vehicle is present in the lane change destination lane. In addition, the speed profile generation unit 16 is capable of calculating the obstacle situation speed that depends on the situation of the moving obstacle around the vehicle by various known methods.

The speed profile generation unit 16 sets the target vehicle speed equal to or less than the lowest one of the upper limit speed, the speed limit, the curvature corresponding speed, and the obstacle situation speed for each of set positions preset along the lane change path. The set positions preset along the lane change path are positions set at regular intervals on the lane change path and on an extension line that has a certain distance. The target vehicle speed can be, for instance, equal in value to the lowest speed.

The speed profile generation unit 16 generates the speed profile by interpolating the target vehicle speed for each set position so that the deceleration is equal to or less than the deceleration upper limit by preset smooth interpolation processing. Spline interpolation or the like can be used for the smooth interpolation processing. Various types of known supplementary processing can be adopted for the smooth interpolation processing.

Figure 3:
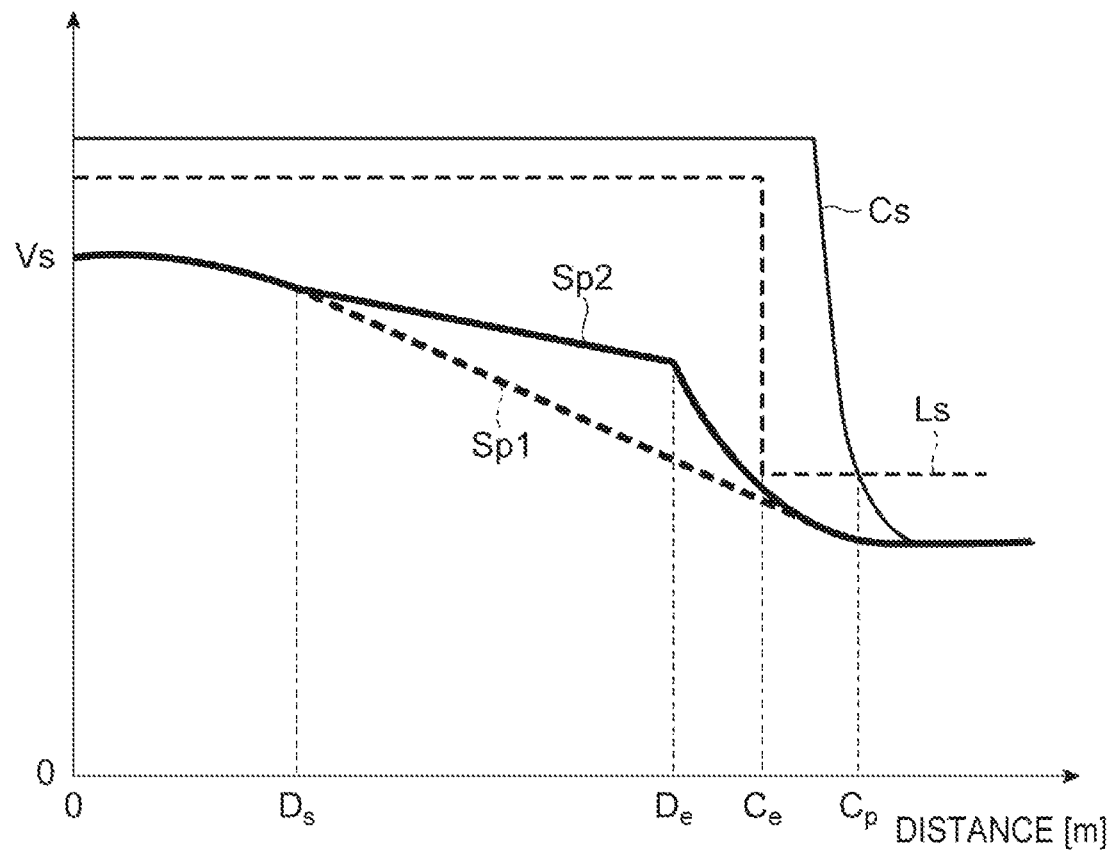
FIG. 3 is a graph illustrating a speed profile of the lane change control.

FIG. 3 is a graph illustrating the speed profile of the lane change control. The vertical axis in FIG. 3 represents the speed of the vehicle and the horizontal axis represents a distance (that is, a position). The graph illustrated in FIG. 3 shows the speed profile of the lane change control of the vehicle M illustrated in FIG. 2. The horizontal axis in FIG. 3 shows the lane change control initiation position Ds, the lane change control termination position De, and the termination position Ce of the common part of the limited-access road lane R1 and the exit road lane R2. La on the horizontal axis will be described later. In addition, the vertical axis in FIG. 3 shows a current vehicle speed Vs of the vehicle M (that is, the vehicle speed of the vehicle M illustrated in FIG. 2).

In FIG. 3, each of an upper limit speed Ls corresponding to a set maximum speed, a curvature corresponding speed Cs, a speed profile Sp1 when the deceleration upper limit is not changed, and a speed profile Sp2 when the deceleration upper limit has a low value is shown in a form of a graph. The upper limit speed Ls corresponding to a set maximum speed is an upper limit speed corresponding to the set maximum speed (legal maximum speed here) that corresponds to the position of the vehicle M.

The speed of the vehicle M is 100 km/h before the vehicle M reaches the termination position Ce of the common part and is 40 km/h after the vehicle M reaches the termination position Ce of the common part. Beyond the termination position Ce of the common part, the curvature corresponding speed Cs is a low value corresponding to the steep curve ahead. The curvature corresponding speed Cs is a minimum speed below the upper limit speed Ls at a position Cp. In other words, the position Cp is a position where the curvature corresponding speed Cs is below the upper limit speed Ls.

In the situation illustrated in FIGS. 2 and 3, no speed limit calculation is performed because no speed limit point, such as the temporary stop line, appears. Likewise, no obstacle situation speed calculation is performed because no moving obstacle appears. In addition, although description of set position is omitted in FIG. 3, the set positions can be set, for instance, every 0.5 m.

In the situation illustrated in FIGS. 2 and 3, the speed profile generation unit 16 sets the target vehicle speed equal to or less than the lowest one of the upper limit speed Ls and the curvature corresponding speed Cs for each set position preset along the lane change path. As illustrated in FIG. 3, the upper limit speed Ls is the lowest speed until the vehicle M reaches the position Cp and the curvature corresponding speed Cs is the lowest speed after the vehicle M reaches the position Cp. The speed profile generation unit 16 sets a target vehicle speed equal to or less than the upper limit speed Ls until the vehicle M reaches the position Cp and sets a target vehicle speed equal to or less than the curvature corresponding speed Cs after the vehicle M reaches the position Cp based on the current vehicle speed Vs of the vehicle M.

The speed profile generation unit 16 generates the speed profile by interpolating the target vehicle speed inter-set position by the preset smooth interpolation processing. Here, the speed profile generation unit 16 generates the speed profile Sp2 such that the deceleration upper limit in the lane change control is lower in value than when the deceleration condition determination unit 15 determines that the deceleration condition in the lane change control is not satisfied with the deceleration condition determination unit 15 having determined that the deceleration condition in the lane change control is satisfied.

Accordingly, the speed profile generation unit 16 is capable of rendering the deceleration in the lane change control gentle in comparison to the speed profile Sp1 in which the deceleration upper limit is not a low value. As a result, the speed profile generation unit 16 is capable of decelerating the vehicle M with appropriate deceleration after the vehicle M completes the lane change by reaching the lane change control termination position De and adjusting the speed of the vehicle M to a speed equal to or less than the upper limit speed Ls and the curvature corresponding speed Cs, and thus a following vehicle excessively approaching the vehicle M due to the significant deceleration during the lane change control can be suppressed even when the following vehicle is present behind the vehicle M. The speed profile generation unit 16 may also adopt various known speed profile generation methods not limited to the above-described speed profile generation method insofar as the speed profile generation unit 16 uses the deceleration upper limit set by the deceleration condition determination unit 15.

The vehicle control unit 17 executes the autonomous driving of the vehicle based on the map information of the map database 4, the position of the vehicle on the map recognized by the vehicle position recognition unit 11, the surrounding environment regarding the vehicle recognized by the surrounding environment recognition unit 12, the traveling state of the vehicle recognized by the traveling state recognition unit 13, and the traveling plan generated by the traveling plan generation unit 14.

The vehicle control unit 17 executes the lane change control as a part of the autonomous driving. The vehicle control unit 17 executes the lane change control for the vehicle based on the lane change path generated by the traveling plan generation unit 14 and the speed profile generated by the speed profile generation unit 16. During the execution of the lane change control, the vehicle control unit 17 controls the traveling of the vehicle along the speed profile by transmitting the control signal to the actuator 5.

Lane Change Control of Vehicle Control Device

Hereinafter, speed profile generation processing of the vehicle control device 100 according to the example will be described with reference to FIG. 4. FIG. 4 is a flowchart illustrating the speed profile generation processing of the lane change control. The processing of the flowchart illustrated in FIG. 4 is executed when the lane change control for the vehicle is planned.

As illustrated in FIG. 4, in S10, the deceleration condition determination unit 15 of the ECU 10 of the vehicle control device 100 determines whether or not the deceleration condition in the lane change control is satisfied. The deceleration condition determination unit 15 determines whether or not the deceleration condition in the lane change control is satisfied based on the lane change path and the map information. The deceleration condition determination unit 15 determines that the deceleration condition is satisfied when the curvature of the lane change destination lane is equal to or greater than the curve determination threshold. The deceleration condition determination unit 15 may also determine that the deceleration condition is satisfied when the set maximum speed of the traveling lane of the vehicle exceeds the set maximum speed of the lane change destination lane by a certain value or more. The ECU 10 proceeds to S12 when the deceleration condition determination unit 15 determines that the deceleration condition in the lane change control is not satisfied (S10: NO). The ECU 10 proceeds to S14 when the deceleration condition determination unit 15 determines that the deceleration condition in the lane change control is satisfied (S10: YES).

In S12, the deceleration condition determination unit 15 of the ECU 10 sets the deceleration upper limit in the lane change control to a first value. The first value is a value preset as a normal value (initial value). Subsequently, the ECU 10 proceeds to S16.

In S14, the deceleration condition determination unit 15 of the ECU 10 sets the deceleration upper limit in the lane change control to a second value. The second value is a value preset as a value lower than the first value. Subsequently, the ECU 10 proceeds to S16.

In S16, the speed profile generation unit 16 of the ECU 10 generates the speed profile based on the deceleration upper limit. The speed profile generation unit 16 generates the speed profile based on the map information of the map database 4, the surrounding environment regarding the vehicle recognized by the surrounding environment recognition unit 12, the traveling state of the vehicle recognized by the traveling state recognition unit 13, the lane change path generated by the traveling plan generation unit 14, and the deceleration upper limit set by the deceleration condition determination unit 15.

Action and Effect of Vehicle Control Device

In the vehicle control device 100 according to the example described above, the speed profile is generated such that the deceleration upper limit of the vehicle in the lane change control is lower in value when the deceleration condition in the lane change control is satisfied because of the presence of a steep curve in the lane change destination lane or the like than when the deceleration condition determination unit 15 determines that the deceleration condition is not satisfied, and thus the significant deceleration during the lane change control can be suppressed.

In addition, in the vehicle control device 100, the deceleration condition determination unit 15 determines that the deceleration condition in the lane change control is satisfied when a curve is present in the lane change destination lane to the extent that deceleration is needed, and thus significant deceleration during the lane change control for curve entry can be suppressed.

Furthermore, in the vehicle control device 100, the set maximum speed of the lane change destination is responded to when the deceleration condition determination unit 15 determines that the deceleration condition is satisfied when the set maximum speed (such as the legal maximum speed) of the traveling lane of the vehicle exceeds the set maximum speed of the lane change destination lane by a certain value or more, and thus the significant deceleration during the lane change control can be suppressed.

Moreover, in the vehicle control device 100, the speed profile is generated so that the deceleration is equal to or less than the deceleration upper limit in view of the upper limit speed preset from the current vehicle speed of the vehicle and so on, the speed limit of the speed limit point such as the temporary stop line, the curvature corresponding speed that depends on the curvature, and the obstacle situation speed that depends on a moving obstacle situation, and thus the significant deceleration during the lane change control can be suppressed with various situations taken into account.

The present disclosure is not limited to the preferred example of the present disclosure described above. The present disclosure can be implemented in various forms changed and improved from the above-described example based on the knowledge of those skilled in the art.

The vehicle control device 100 does not necessarily have to perform the autonomous driving for the vehicle and may be capable of executing the lane change control. In this case, the vehicle control device 100 may have a lane change path generation unit that has a lane change path generation function instead of the traveling plan generation unit 14. The lane change control is initiated by, for instance, a driver operating a direction indicator lever in a situation in which the lane change control can be performed.

The deceleration condition determination unit 15 does not necessarily have to determine that the deceleration condition is satisfied when the curvature of the lane change destination lane is equal to or greater than the curve determination threshold. The deceleration condition determination unit 15 may determine the deceleration condition by using at least one of the curvature, the width, and the falling gradient of the lane change destination lane.

From ecological and fuel efficiency viewpoints, the speed profile generation unit 16 may generate the speed profile for gentle deceleration when the target vehicle speed for each set position is interpolated. Known methods can be adopted for the speed adjustment based on the ecological and fuel efficiency viewpoints.

What is claimed is:

1. A vehicle control device configured to perform lane change control for a vehicle along a preset lane change path, the vehicle control device comprising:
    a memory configured to store map information; and
    a processor configured to:
        determine, based on the map information, whether a static factor in a traveling path of the lane change control causes deceleration of the vehicle that exceeds a certain value or more;
        based on determining that a static factor in the traveling path of the lane change control causes a deceleration of the vehicle that exceeds the certain value, generate a first speed profile where a deceleration upper limit of the vehicle in the lane change control is a first value that is lower in value than a second value, and control a vehicle speed of the vehicle along the first speed profile when the lane change control is executed; and
        based on determining that there is not a static factor in the traveling path of the lane change control that causes deceleration of the vehicle to exceed the certain value, generate a second speed profile where the deceleration upper limit of the vehicle in the lane change control is the second value, and control a vehicle speed of the vehicle along the second speed profile when the lane change control is executed.

2. The vehicle control device according to claim 1, wherein the processor is further configured to determine that the static factor in the traveling path of the lane change control causes deceleration of the vehicle that exceeds the certain value or more when a curvature of a lane that is a lane change destination according to the lane change control is equal to or greater than a curve determination threshold.

3. The vehicle control device according to claim 1, wherein
the map information includes information on set maximum speeds associated with lanes on a map, and
the processor is further configured to determine that the static factor in the traveling path of the lane change control causes deceleration of the vehicle that exceeds the certain value or more when a set maximum speed of a traveling lane of the vehicle exceeds the set maximum speed of a lane that is a lane change destination by a certain value or more.

4. The vehicle control device according to claim 1, wherein the processor is further configured to generate one of the speed profiles by:
calculating each of a preset upper limit speed, a speed limit at a speed limit point included in the map information, a curvature corresponding speed that depends on a curvature of the traveling lane of the vehicle, and an obstacle situation speed that depends on a situation of a moving obstacle around the vehicle,
setting a target vehicle speed equal to or less than a lowest one of the upper limit speed, the speed limit, the curvature corresponding speed, and the obstacle situation speed for each of set positions preset along the lane change path, and
interpolating the target vehicle speed for each of the set positions so that the deceleration is equal to or less than the deceleration upper limit by preset smooth interpolation processing.

5. The vehicle control device according to claim 2, wherein
the map information includes information on set maximum speeds associated with lanes on a map, and
the processor is further configured to determine that the static factor in the traveling path of the lane change control causes deceleration of the vehicle that exceeds the certain value or more when the set maximum speed of a traveling lane of the vehicle exceeds the set maximum speed of a lane that is a lane change destination by a certain value or more.

6. The vehicle control device according to claim 2, wherein the processor is further configured to generate one of the speed profiles by:
calculating each of a preset upper limit speed, a speed limit at a speed limit point included in the map information, a curvature corresponding speed that depends on a curvature of the traveling lane of the vehicle, and an obstacle situation speed that depends on a situation of a moving obstacle around the vehicle,
setting a target vehicle speed equal to or less than a lowest one of the upper limit speed, the speed limit, the curvature corresponding speed, and the obstacle situation speed for each of set positions preset along the lane change path, and
interpolating the target vehicle speed for each of the set positions so that the deceleration is equal to or less than the deceleration upper limit by preset smooth interpolation processing.

7. The vehicle control device according to claim 3, wherein the processor is further configured to generate one of the speed profiles by:
calculating each of a preset upper limit speed, a speed limit at a speed limit point included in the map information, a curvature corresponding speed that depends on a curvature of the traveling lane of the vehicle, and an obstacle situation speed that depends on a situation of a moving obstacle around the vehicle,
setting a target vehicle speed equal to or less than a lowest one of the upper limit speed, the speed limit, the curvature corresponding speed, and the obstacle situation speed for each of set positions preset along the lane change path, and
interpolating the target vehicle speed for each of the set positions so that the deceleration is equal to or less than the deceleration upper limit by preset smooth interpolation processing.

8. The vehicle control device according to claim 5, wherein the processor is further configured to generate one of the speed profiles by:
calculating each of a preset upper limit speed, a speed limit at a speed limit point included in the map information, a curvature corresponding speed that depends on a curvature of the traveling lane of the vehicle, and an obstacle situation speed that depends on a situation of a moving obstacle around the vehicle,
setting a target vehicle speed equal to or less than a lowest one of the upper limit speed, the speed limit, the curvature corresponding speed, and the obstacle situation speed for each of set positions preset along the lane change path, and
interpolating the target vehicle speed for each of the set positions so that the deceleration is equal to or less than the deceleration upper limit by preset smooth interpolation processing.

9. The vehicle control device according to claim 1, wherein the processor is further configured to determine that the static factor in the traveling path of the lane change control causes deceleration of the vehicle that exceeds the certain value or more when one of the following conditions occurs:
(1) when a curvature of a lane that is a lane change destination according to the lane change control is equal to or greater than a curve determination threshold, or
(2) when a set maximum speed of a traveling lane of the vehicle exceeds the set maximum speed of a lane that is a lane change destination by a certain value or more.

10. A vehicle control method implemented by a processor, the vehicle control method comprising:
storing map information;
determining, based on the map information, whether a static factor in a traveling path of the lane change control causes deceleration of the vehicle that exceeds a certain value or more;
based on determining that a static factor in the traveling path of the lane change control causes a deceleration of the vehicle that exceeds the certain value, generating a first speed profile where a deceleration upper limit of the vehicle in the lane change control is a first value that is lower in value than a second value, and controlling a vehicle speed of the vehicle along the first speed profile when the lane change control is executed; and
based on determining that there is not a static factor in the traveling path of the lane change control that causes deceleration of the vehicle to exceed the certain value, generating a second speed profile where the deceleration upper limit of the vehicle in the lane change control is the second value, and controlling a vehicle speed of the vehicle along the second speed profile when the lane change control is executed.

11. The vehicle control method according to claim 10, wherein the determining that the static factor in the traveling path of the lane change control causes deceleration of the vehicle that exceeds the certain value or more occurs when one of the following conditions is met:
- (1) when a curvature of a lane that is a lane change destination according to the lane change control is equal to or greater than a curve determination threshold, or
- (2) when a set maximum speed of a traveling lane of the vehicle exceeds the set maximum speed of a lane that is a lane change destination by a certain value or more.

\* \* \* \* \*